J. S. SHOPE & J. K. SHANAMAN.
FUNNEL HOLDER.
APPLICATION FILED MAR. 23, 1912.
1,045,622.                                      Patented Nov. 26, 1912.
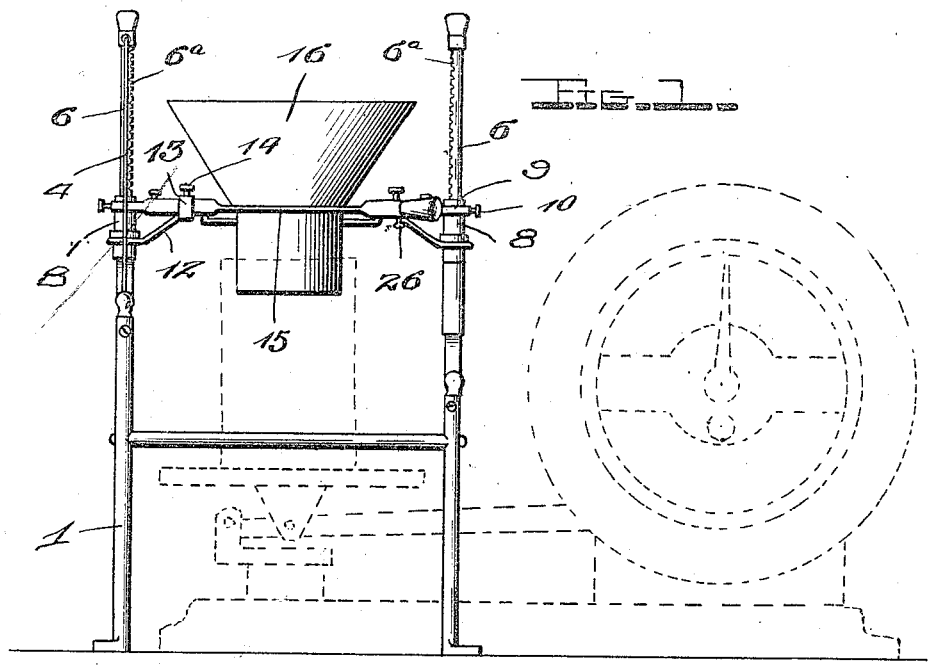
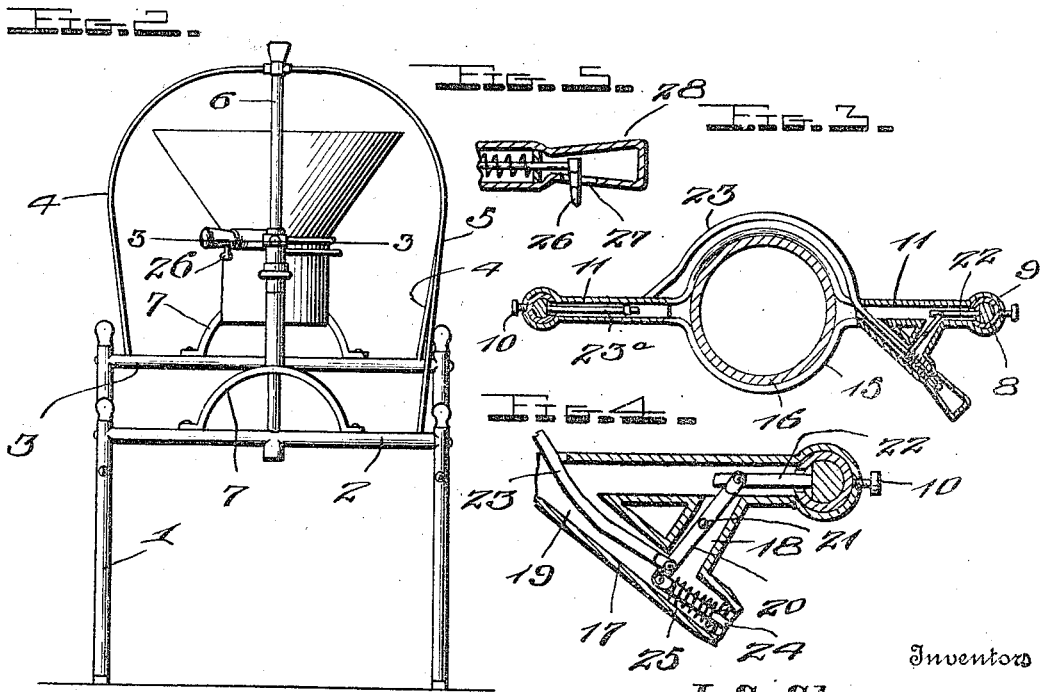
Witnesses
Chas. L. Griesbauer
A. B. Norton.
Inventors
J. S. Shope and
J. K. Shanaman,
By Watson E. Coleman
Attorney

UNITED STATES PATENT OFFICE.

JOHN S. SHOPE AND JOHN K. SHANAMAN, OF ANNVILLE, PENNSYLVANIA.

FUNNEL-HOLDER.

1,045,622.  Specification of Letters Patent.  Patented Nov. 26, 1912.

Application filed March 23, 1912. Serial No. 685,810.

*To all whom it may concern:*

Be it known that we, JOHN S. SHOPE and JOHN K. SHANAMAN, citizens of the United States, residing at Annville, in the county of Lebanon and State of Pennsylvania, have invented certain new and useful Improvements in Funnel-Holders, of which the following is a specification, reference being had to the accompanying drawings.

This invention comprehends certain new and useful improvements in store furniture and relates particularly to an improved funnel holder, the invention having for its primary object means whereby a funnel may be held at different elevations over the platform of scales, whereby a paper bag or sack may be supported directly on the platform and weighed with the material poured into it, instead of the ordinary operation of weighing the commodities in a scoop carried by the beam of the scales and subsequently pouring the sugar or the like from the scoop into the sack.

The invention has for another object a simple, durable, efficient and attractive device of this character, the parts of which are so constructed and arranged that they may be easily manufactured and readily assembled, and whereby the funnel may be easily adjusted in a vertical direction so that it may be held at the proper elevation, according to the size of sack or bag being filled.

The invention also has for its object a simple device of this character which will, in its use, interfere in no wise with the operation of the scales and also not interfere with the movements of the store-keeper in pouring the sugar, flour or the like into the sack through the funnel which is held by the device. And the invention also aims to generally improve devices of this class and to render them more useful and commercially desirable.

With these and other objects in view, as will more fully appear as the description proceeds, the invention consists in certain constructions, arrangements and combinations of the parts that we shall hereinafter fully describe and claim.

For a full understanding of the invention, reference is to be had to the following description and accompanying drawing, in which, Figure 1 is a side elevation of our improved funnel holder, weighing scales being shown in dotted lines for the purposes of illustration. Fig. 2 is a side elevation of the device at right angles to Fig. 1. Fig. 3 is a detail horizontal section on the line 3—3, of Fig. 2. Fig. 4 is a fragmentary sectional view on an enlarged scale, and, Fig. 5 is a detail section of the handle portion of the apparatus.

Corresponding and like parts are referred to in the following description and designated in the accompanying drawing by like reference characters.

Our improved funnel holder adapted for use in connection with weighing scales, includes a preferably rectangular frame 1 which embodies standards or uprights that are connected together by cross bars 2 and 3, one of which is lower than the other, as best indicated in Fig. 2. This frame is adapted to be placed on a counter in juxtaposition to weighing scales of conventional or any desired type, whereby the platform of the scales indicated in dotted lines in Fig. 1, will be received within the framework in an evident manner. Arched braces 4 are secured to the cross bar 3, and a single arched brace 5 is connected to the cross bar 2. These cross bars assist in supporting laterally spaced and vertically disposed posts 6 which are secured at their lower ends to the respective cross bars 2 and 3, and which project upwardly therefrom, as clearly illustrated in the drawing. To further assist in bracing these uprights or posts 6, we provide curved braces 7. Only one of the braces 5 is used on one side of the apparatus, in order to leave a proper clearance space for the movements of the operator's arm in manipulating the device and in pouring the commodities into a sack supported upon the platform of the scales.

The posts 6 are encircled by sleeves 8 which are slidingly mounted thereon and which are in turn encircled by collars 9 that are secured thereto in any desired way, as by set screws 10 or similar fastening devices. The collars 9 are formed on or secured to the outer ends of horizontally disposed tubes 11 which extend inwardly toward each other in longitudinal alinement and which are preferably braced intermediate of their ends to the sleeves 8 by means of oblique brace rods 12 secured to collars 13 fastened by set screws 14 on the tubes, as best illustrated in Fig. 1. The inner ends of the tubes 11 are connected together by oppositely disposed curved rods 15 which together form a pocket for the reception of a funnel 16 designed to rest loosely therein.

One of the tubes 11 is formed with a lateral extension 17 provided with passages or doors 18 and 19, communicating with each other and with the interior of the main portion of the tube, as shown in Fig. 4. A lever 20 is fulcrumed intermediate of its ends, as at 21, within the opening 18 of the extension 17 and is pivotally connected at one end with a latch 22 which is designed for engagement with the teeth of a vertical rack bar 6ª formed on the adjoining post 6. The other end of the lever 20 is pivotally connected to a latch rod 23 which extends around the funnel holder or pocket which is composed of the curved rods 15 and which passes upwardly through a slot formed in the other tube 11, being provided within said tube with a latch 23ª, designed to engage the teeth of the corresponding rack bar 6ª formed on the other post. In order to operate these latches, we provide a handle rod 24 which is encircled by a coiled spring 25 designed to move said rod and its correlated parts in a direction to effect the engagement of the latches with the racks, said handle rod being formed at one end with a finger piece 26 which projects out through and works in a longitudinal slot 27 formed in a handle 28 that extends obliquely from the device and which preferably forms an integral part of the extension 17.

From the foregoing description in connection with the accompanying drawing, the operation of our improved funnel holder will be apparent. In the practical use of the device, the tubes 11 are raised or lowered, as required, in order to hold the funnel 16 at the proper elevation, according to the size of sack to be used. In this operation of the device, it is obvious that it is only necessary for the operator to grasp the handle 28 and to use one finger to press upon the finger piece 26 so as to move the lever 20 in a direction to retract the latches 22 from the racks 6ª, whereupon the tubes and the funnel supported thereby may be instantly raised or lowered. It will be seen that the device does not detract in any way from the appearance of the scales, but on the other hand, serves as an attractive accessory for the other furniture of the store, and that by the use of the device, the storekeeper is not required to hold the funnel in his hand while using a scoop or the like.

While the accompanying drawing illustrates what we believe to be the preferred embodiment of our invention, it is to be understood that the invention is not limited thereto, but that various changes may be made in the construction, arrangement and proportions of the parts without departing from the scope of the invention, as defined in the appended claims.

What we claim is:—

1. A device of the character described, including a frame designed to inclose the platform of weighing scales, posts projecting upwardly from and supported by said frame, tubes slidingly mounted on said posts and provided between them with a funnel holding pocket, latches carried by said tubes and adapted to automatically engage said posts, for the purpose specified, a handle connected to said tubes, and means carried by said handle for retracting the latches.

2. A device of the character described, including a frame, posts projecting upwardly from said frame and supported thereby, sleeves slidingly mounted on said posts, tubes carried by said sleeves and projecting inwardly therefrom toward each other, oppositely disposed curved rods connected to the inner ends of said tubes, a handle connected to one of said tubes, spring brace latches carried by the tubes and adapted to engage said posts, and means carried by said handle for retracting said latches.

3. A device of the character described, including a frame, posts projecting upwardly from said frame and supported thereby, sleeves slidingly mounted on said posts, collars secured to said sleeves, tubes connected to said collars and extending inwardly toward each other, oppositely disposed rods connected to the inner ends of said tubes, one of said tubes being formed with a lateral extension and a handle connected to said extension, a lever mounted in said extension, a latch connected to one arm of said lever and mounted in one tube and adapted to engage one of said posts, a latch rod pivotally connected to the other arm of said lever and extending from said extension around one of the first named rods and provided with a latch working in the other tube against the other post, a handle connected to said extension, a handle rod mounted in said handle and provided with a finger piece, and a spring encircling said handle rod, for the purpose specified.

In testimony whereof we hereunto affix our signatures in the presence of two witnesses.

JOHN S. SHOPE.
JOHN K. SHANAMAN.

Witnesses:
 MARY E. DEAN,
 EMMA DEAN.

---

Copies of this patent may be obtained for five cents each, by addressing the "Commissioner of Patents, Washington, D. C."